United States Patent [19]

Fujikawa

[11] Patent Number: 4,676,271

[45] Date of Patent: Jun. 30, 1987

[54] VALVE CAPABLE OF BIDIRECTIONAL FLOW

[75] Inventor: Toshihiro Fujikawa, Higashikurume, Japan

[73] Assignee: Kyowa Engineering Co., Ltd., Tokyo, Japan

[21] Appl. No.: 844,684

[22] Filed: Mar. 27, 1986

[30] Foreign Application Priority Data

Apr. 3, 1985 [JP] Japan .............................. 60-070237
Apr. 3, 1985 [JP] Japan .............................. 60-070238

[51] Int. Cl.$^4$ .............................................. F16K 31/38
[52] U.S. Cl. ............................ 137/614.21; 137/614.2; 251/44
[58] Field of Search ............ 137/596.14, 614.2, 614.21, 137/901; 251/44

[56] References Cited

U.S. PATENT DOCUMENTS

| | | | |
|---|---|---|---|
| 641,009 | 1/1900 | Gulland | 251/44 X |
| 2,891,518 | 6/1959 | Krapf | 137/596.18 |
| 3,023,997 | 3/1962 | Schultz | 251/44 X |
| 3,204,926 | 9/1965 | Wismar | 251/44 X |
| 3,360,234 | 12/1967 | Thorborn | 251/44 |
| 3,905,393 | 9/1975 | Hartwig | 137/901 X |
| 4,391,183 | 7/1983 | Broms et al. | 251/44 X |

FOREIGN PATENT DOCUMENTS

| | | | |
|---|---|---|---|
| 65399 | 7/1913 | Switzerland | 251/44 |
| 1512255 | 5/1978 | United Kingdom | 137/596.14 |

*Primary Examiner*—Gerald A. Michalsky
*Attorney, Agent, or Firm*—Price, Heneveld, Cooper, DeWitt & Litton

[57] ABSTRACT

An improved valve structure is disclosed, which comprises a sleeve containing a valve chamber and a valve seat therein, a valve body slidably accommodated in the sleeve and having a spherical surface, an axial port formed in the sleeve so as to communicate with the valve seat, a front chamber formed between the valve body and the valve seat, a side port formed in the side wall of the valve chamber and communicated with the front chamber, a spring receiver provided at an end of the sleeve in the opposite direction to the valve seat, a rear chamber formed between the valve body and the spring receiver, a spring disposed between the spring receiver and the valve body to bias the valve body towards the valve seat, a communication passageway formed to communicate the front chamber with the rear chamber and having a smaller cross-section area than the side port, a control passageway provided in communication with the rear chamber to communicate the rear chamber with the exterior of the valve chamber, and a control valve provided in the control passageway.

17 Claims, 11 Drawing Figures

VALVE CAPABLE OF BIDIRECTIONAL FLOW

BACKGROUND OF THE INVENTION

1. Field of the Invention

The present invention relates to a valve that is available in a fluid system such as various kinds of oil hydraulic instruments.

2. Description of the Prior Art

Heretofore, as the above-mentioned type of valves, valves nearly as shown in FIG. 11 have been generally employed. In this figure, reference character a designates a valve main body in which a cylindrical valve chamber b is formed. Reference character c designates a valve seat of circular shape, reference character d designates a valve body having a frusto-conical head portion e and a cylindrical body portion f, reference character g designates an actuating rod, reference character h designates a solenoid, reference character i designates a side port, reference character j designates an axial port, reference character k designates a spring, reference character l designates a spring receiver, reference character m designates an O-ring, and reference character n designates a slide portion. If the solenoid h is actuated, then a passageway between the valve seat c and the valve body d is opened, so that the side port i and the axial port j are communicated with each other. However, the heretofore known valve shown in FIG. 11 involves the following problems.

That is, if the valve is used over a long period of time under the pressure of a pressurized oil or the like applied through the side port i, then the balance in position of the valve body d is lost due to a side pressure applied in one direction, hence the valve body d becomes unable to engage with the valve seat c with its center correctly aligned with the center of the valve seat c, and in some cases, leakage of oil would occur. In addition, as another problem, the O-ring m at the slide portion n would be kept fixedly secured to the valve main body a after a long period of use, and so, in some cases, operation of the valve would become faulty.

SUMMARY OF THE INVENTION

It is therefore one object of the present invention to provide an improved valve in which there is no fear that imperfect engagement between a valve body and a valve seat caused by misalignment of their center axes may arise due to a side pressure applied in one direction as described above when the valve has been used over a long period of time.

Another object of the present invention is to provide an improved valve in which there is no fear that faulty operation may occur due to fixed sticking of an O-ring at a slide portion of a valve body to a valve main body.

Still another object of the present invention is to provide an improved valve which can control a fluid at a high pressure with a small force.

According to one feature of the present invention, there is provided a valve comprising a sleeve containing a cylindrical valve chamber and a circular valve seat therein, a valve body slidably accommodated within the valve chamber and having a spherical surface adapted to come into contact with the valve seat, an axial port formed in the sleeve so as to be communicated with the valve seat, a front chamber formed between the valve body and the valve seat, a side port formed in a side wall of the valve chamber and communicated with the front chamber, a spring receiver provided at an end of the sleeve in the opposite direction to the valve seat, a rear chamber formed between the valve body and the spring receiver, a spring disposed between the spring receiver and the valve body to bias the valve body towards the valve seat, a communication passageway formed to communicate the front chamber with the rear chamber and having a smaller cross-section area than the side port, a control passageway provided in communication with the rear chamber to communicate the rear chamber with the extension of the valve chamber, and a control valve provided in the control passageway.

According to another feature of the present invention, there is provided a valve comprising a sleeve containing two cylindrically formed valve chambers and two circular valve seats provided in an opposed relationship therein, an axial passageway for communicating axial ports respectively communicated with the respective valve seats with each other, valve bodies respectively slidably accommodated in the respective valve chambers and having spherical surfaces adapted to come into contact with the respective valve seats, spring receivers respectively provided at the opposite ends of the sleeve as opposed to the respective valve seats, front chambers respectively formed between the valve seats and the valve bodies in the respective valve chambers, rear chambers respectively formed between the spring receivers and the valve bodies in the respective valve chambers, springs respectively disposed between the respective valve bodies and the respective spring receivers, side ports formed in side walls of the respective valve chambers and communicated with the respective front chambers, communication passageways formed to communicate the respective front chambers with the corresponding rear chambers and having a smaller cross-section area than the side ports, control passageways provided so as to open respectively in the respective rear chambers to communicate the respective rear chambers with the exterior of the valve chambers, check valves respectively provided in the respective control passageways, and control valves provided in the respective control passageways downstream of the check valves.

The above-mentioned and other features and objects of the present invention will be better understood from perusal of the following description of preferred embodiments of the present invention taken in conjunction with the accompanying drawings.

DESCRIPTION OF THE PREFERRED EMBODIMENTS

Figure 1:
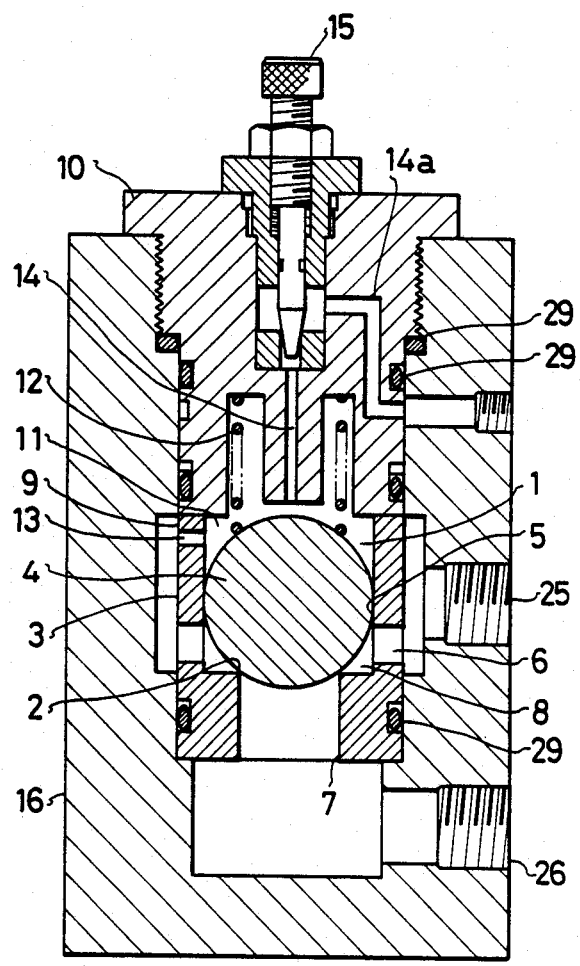
FIG. 1 is a longitudinal cross-section view of a valve according to a first preferred embodiment of the present invention.

Referring now to FIG. 1, reference numeral 3 designates a sleeve in which a valve chamber 1 and a valve seat 2 are formed, a spherical valve body 4 is slidably accommodated within the valve chamber 1, and an axial port 7 is formed in the sleeve 3 so as to be communicated with the valve seat 2. Between the valve body 4 and the valve seat 2 is formed a front chamber 8, and in a side wall 5 of the sleeve 3 is formed a side port 6 communicating with the front chamber 8. In addition, a spring receiver 10 is provided at one end of the sleeve 3 in the opposite direction to the valve seat 2, and between this spring receiver 10 and the valve body 4 is formed a rear chamber 11. Between the spring receiver 10 and the valve body 4 is disposed a spring 12, by which the valve body 4 is biased towards the valve seat 2. The front chamber 8 and the rear chamber 11 are communicated with each other through a communication passageway 13 having a smaller cross-section area than the side port 6. In the spring receiver 10 is provided a control passageway 14 for communicating the rear chamber 11 with the exterior, and in this control passageway 14 is provided a control valve 15.

Figure 4:
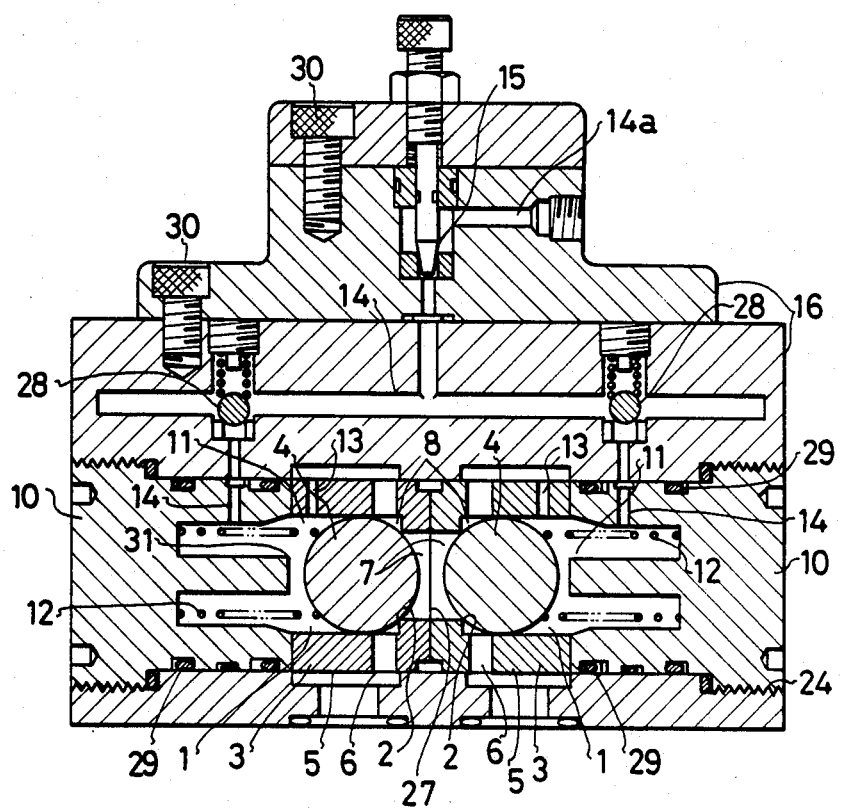
FIG. 4 is a longitudinal cross-section view of a more practical type of valve according to a fourth preferred embodiment of the present invention.

In another preferred embodiment illustrated in FIG. 4, there is provided one composite sleeve which could be formed either integrally or by jointing two sleeve portions 3,3 of the same shape as opposed to each other in a symmetric manner as shown in FIG. 4, each of the sleeve portions 3,3 containing a cylindrical valve chamber 1 and a circular valve seat 2 on one side in its axial direction therein, and axial ports 7,7 communicating with the respective valve seats 2,2 are communicated with each other through an axial passageway 27. In the respective valve chambers 1 are slidably accommodated spherical valve bodies 4, respectively, and in the respective sleeve portions 3, spring receivers 10 are provided on the opposite sides to the valve seats 2. In the respective valve chambers 10, between the valve seats 2 and the valve bodies 4 are formed front chambers 8, and between the respective valve bodies 4 and the corresponding spring receivers 10 are formed rear chambers 11. Springs 12 are disposed between the respective valve bodies 4 and the corresponding spring receivers 10, and side ports 6 communicating with the respective front chambers 8 are opened in the side walls 5 of the respective sleeve portions 3. In addition, communication passageways 13 having a smaller cross-section area than the side ports 6 are formed respectively in the side walls 5 of the respective sleeve portions 3 to communicate the respective front chambers 8 with the corresponding rear chambers 11. In the respective spring receivers 10 are respectively formed control passageways 14 for communicating the corresponding rear chambers 11 with the exterior, and in extensions of the respective control passageways 14 formed in a main body 16 as will be described later are respectively provided check valves 28. And, in the control passageways 14 including their extensions, a control valve 15 is provided downstream of the check valves 28.

Figure 2:
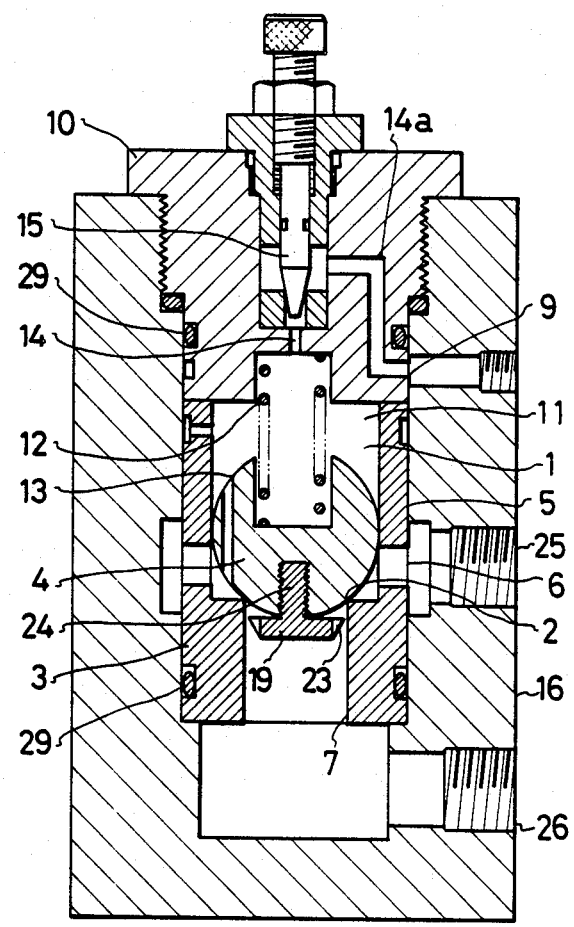
FIG. 2 is a longitudinal cross-section view of a valve according to a second preferred embodiment of the present invention.
Figure 3:
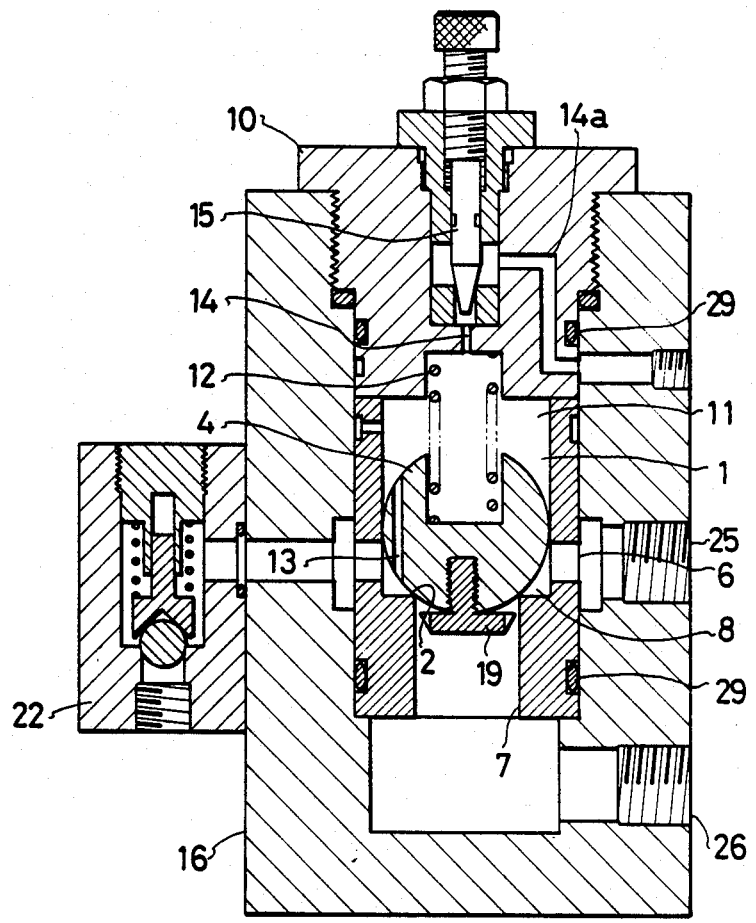
FIG. 3 is a longitudinal cross-section view of a valve according to a third preferred embodiment of the present invention.

It is to be noted that the above-mentioned valve body 4 could be formed in a spherical or nearly spherical shape as shown in FIGS. 1 to 5 and 7, or else it could be composed of a head portion 17 formed in a hemispherical or nearly hemispherical shape and a cylindrical body portion 18 that is contiguous to the former. Also, the communication passageway 13 could be formed either in the sleeve 3 as shown in FIG. 1 or in the valve body 4 as shown in FIGS. 2 and 3. Furthermore, the control passageway 14 could be communicated with a drain passageway 14a as shown in FIGS. 1 to 4.

Now, description will be made on the operation of the valve illustrated in FIG. 1. Although a pressurized fluid is passed from the side port 6 up to the front chamber 8, the fluid cannot flow from the side port 6 to the axial port 7 because the valve seat 2 is closed by the valve body 4. However, the same fluid can fill the rear chamber 11 through the communication passageway 12. It is to be noted that in the case where the pressurized fluid is fed from the axial port 7, then in distinction from the first-mentioned case, the fluid pushes the valve body 4 against the resilient force of the spring 12 and separates the valve body 4 from the valve seat 2, so that the pressurized fluid is allowed to flow out through the side port 6.

In the case where a pressurized fluid is to be fed from the side port 6 to the axial port 7, then the control valve 15 is actuated so as to open the control passageway 14. Then the pressure in the rear chamber 11 communicated with the control passageway 14 becomes lower than that in the front chamber 8. This is because the cross-section area of the communication passageway 13 is smaller than that of the side port 6, that is, a fluid resistance of the communication passageway 13 is higher than that of the side port 6, resulting in a larger pressure drop across the communication passageway 13 than across the side port 6. Consequently, the valve body 4 is pushed towards the rear chamber 11, and is disengaged from the valve seat 2. Thus the fluid flows from the side port 6 to the axial port 7. Subsequently, if it is intended to interrupt the fluid communication, the control passageway 14 is closed by means of the control valve 15. Then, the pressure in the rear chamber 11 is equalized to the pressure in the front chamber 8 by the pressurized fluid supplied through the communication passageway 13, and consequently, the valve body 4 is pushed against the valve seat 2 by the spring 12, resulting in interruption of the above-described fluid communication.

Figure 11:
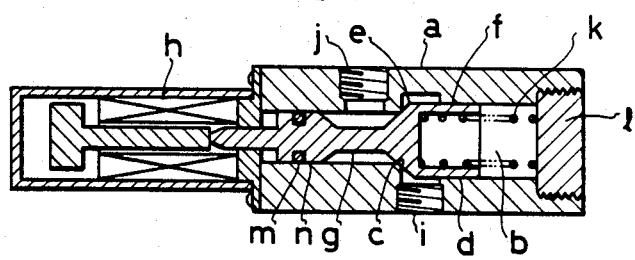
FIG. 11 is a longitudinal cross-section view of a valve in the prior art.

Since generally there exist a clearance between the valve body 4 and the sleeve 3 though only a little, when the valve body 4 is pushed against the valve seat 2 as described above, in the case of the valve body in the prior art as illustrated, for example, in FIG. 11 and described previously, the valve body d would tilt slightly due to the clearance, hence the conical portion of the valve body d would come into contact with the valve seat c along an elliptic contact line, and consequently, sealing between the valve seat c and the valve body d would become imperfect. However, according to the present invention, since the valve body 4 comes into contact with the circular valve seat 2 along its spherical surface or spherical surface portion, even if the attitude of the valve body 4 should change slightly due to the clearance, the valve body 4 would still come into contact with the valve seat 2 along a circular contact line, and therefore, the sealing between the valve body 4 and the valve seat 2 can be always maintained.

Now the operation of the valve according to another preferred embodiment of the present invention illustrated in FIG. 4, will be explained. It is assumed here that a pressurized fluid is supplied to one of the side ports 6 and a fluid communicated with the other side port 6 is not pressurized. Also, for convenience of explanation, in the following description it is assumed, by way of example, that a pressurized fluid is supplied to the side port 6 on the right side as viewed in FIG. 4. Under such condition, in the right side portion of the valve the valve body 4 is kept in tight contact with the valve seat 2 by the resilient force of the spring 12, hence the pressurized liquid is filled in the front chamber 8, the rear chamber 11 and the control passageway 14, but the right side axial port 7 is not opened. Subsequently, under the above-mentioned condition, if the control valve 15 is opened, then in the right side portion of the valve the control passageway 14 is opened, and consequently the rear chamber 11 has a lower pressure than the front chamber 8. This is because it is difficult for the front chamber 8 and the rear chamber 11 to take the same pressure quickly due to the smaller cross-section area of the communication passageway 13 than that of the side port 6. Consequently, in the right side portion of the valve, the valve body 4 is disengaged from the valve seat 2 and moves towards the rear chamber 11, hence the axial port 7 in the right side portion is opened, the pressurized fluid having entered the axial passageway 27 would push the corresponding valve body 4 in the left side portion to move it against the resilient force of the spring 12, and thereby the axial port 7 in the left side portion is opened. In this way, the side ports 6 in the left and right side portions, respectively, are communicated with each other, and so, the pressurized fluid is passed from the side port 6 in the right side portion to the side port 6 in the left side portion.

Subsequently, in the case where it is intended to interrupt the flow of the pressurized fluid, the control valve 15 is closed. Then, the control passageway 14 is closed, and accordingly, in the right side portion of the valve, the rear chamber 11 and the front chamber 8 will take the same pressure within a short period of time. Consequently, the relatively low pressure in the rear chamber 11 disappears, hence the valve body 4 is pushed by the resilient force of the spring 12 to be settled on the valve seat 2, and thereby the axial port 7 is closed.

In this case also, from the same reasons as described above, even if the valve body 4 should have its attitude slightly varied due to the clearance retained between the valve body 4 and the sleeve portion 3, it comes into contact with the valve seat 2 correctly along a circular contact line, so that tight closure between the valve body 4 and the valve seat 2 can be maintained.

Then, as a result of the closure of the communication passageway 27, the pressure in the axial port 7 in the valve chamber 1 in the left side portion disappears, hence the valve body 4 in the left side portion is also biased by the spring 12 to be settled on the valve seat 2, and the state shown in FIG. 4 is restored.

Next, description will be made on other modified embodiments of the present invention as well as the details of the various preferred embodiments of the invention, in the following.

In FIGS. 1 to 5 and 7, the above-mentioned sleeve or sleeve portions 3 are disposed within a main body 16, and the spring receiver 10 is threadedly fitted to the main body 16. Accordingly, the sleeve or sleeve portions 3 can be easily replaced by space parts.

With regard to the control valve 15, although a manual operation type of valve is illustrated, it could be replaced by an electromagnetic operation type of valve or another arbitrary type of valve. And although illustration is omitted, the control valve 15 can be easily changed by replacing the spring receiver 10 or a part of the main body 16.

Figure 8:
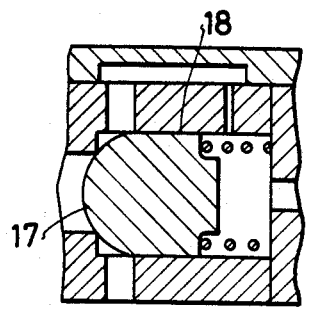
FIG. 8 is a partial cross-section view showing a modification of the valve body.
Figure 9:
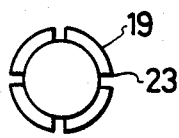
FIG. 9 is a partial plan view showing a part of the valve body in FIG. 2.

In FIG. 8, while a body portion 18 of a valve body is formed in a cylindrical shape, its head portion 17 has a hemispherical or nearly hemispherical shape, so that the valve body can be settled on the valve seat correctly along a circular contact line as described above.

In addition, the valve body 4 is made of a material having a larger hardness than the valve seat 2. By forming the valve body 4 and the valve seat 2 in the above-described manner, in the initial period of use of the valve body 4 and the valve seat 2, the valve seat 2 would be deformed by the impact of the valve body 4 although slightly, so that the settling condition of the valve body 4 can be gradually improved. In other words, the mating between the valve body and the valve seat 2 can be improved.

As shown in FIGS. 2 and 3, a decelerating member 19 could be detachably provided at the bottom of the valve body 4. This decelerating member 19 is tapered as shown in the figures, has grooves 23 formed on its outer circumference, and is adapted to be moved vertically in the axial port 7. Reference numeral 24 designates a threaded portion of the decelerating member 19 for threadedly fitting it into the spherical valve body 4 from its bottom. Owing to the use of the decelerating member 19, the movement of the valve body 4 can be slowed down, and thereby the impact upon settling on the valve seat 2 can be mitigated.

Figure 10:
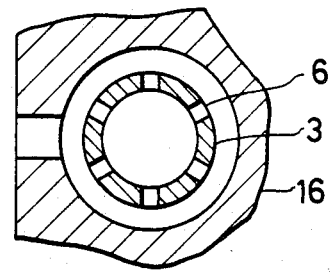
FIG. 10 is a partial horizontal cross-section view of the structure shown in FIG. 1.

The structure for communicating the side ports 6 to the front chamber 8 is such that the side ports 6 are arrayed radially at an equal angular interval as shown in FIG. 10, and thereby the side pressure around the sleeve or sleeve portion 3 can be maintained nearly uniform.

Describing about the gap clearance between the valve body 4 and the sleeve or sleeve portion 3, by way of example, in one structure the clearance of nearly 7/1000 mm was formed. Preferably, this gap clearance should be formed so as to fall within the range of 2/1000 to 15/1000 mm.

In a modified embodiment shown in FIG. 3, a check valve 22 is communicated with the front chamber 8. In addition, reference numeral 25 designates an A-port, numeral 26 designates a B-port and numeral 29 designates an O-ring. While the control passageway 14 is communicated with the drain passageway 14a, this could be communicated with the other appropriate passageway. Reference numeral 30 in FIG. 4 designates bolts. In addition, an opening of the drain passageway 14a is communicated with a tank not shown.

Figure 5:
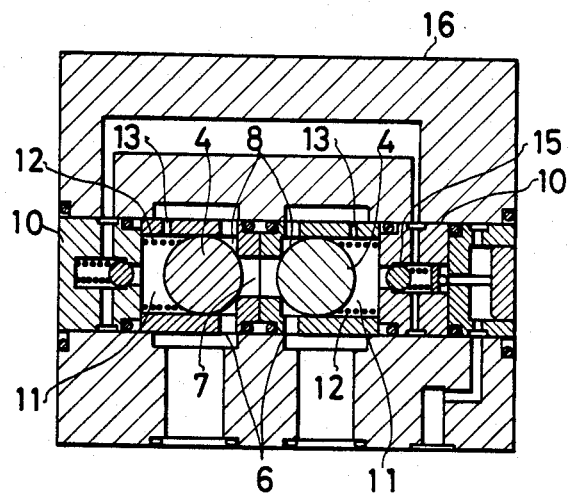
FIG. 5 is a longitudinal cross-section view of a likewise practical type of valve according to a fifth preferred embodiment of the present invention.
Figure 6:
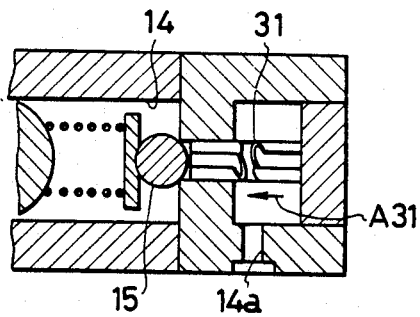
FIG. 6 is an enlarged detailed cross-section view of a part of the structure shown in FIG. 5.

In a modified embodiment shown in FIG. 5, by way of example, a hollow split tube 31 as shown in FIG. 6 is used as a control valve 15. By pushing this split tube 31 in the direction of arrow A31, the control valve 15 is opened to communicate the control passageway 14. It is to be noted that the operation of the embodiment shown in FIG. 5 is similar to that shown in FIG. 4.

Figure 7:
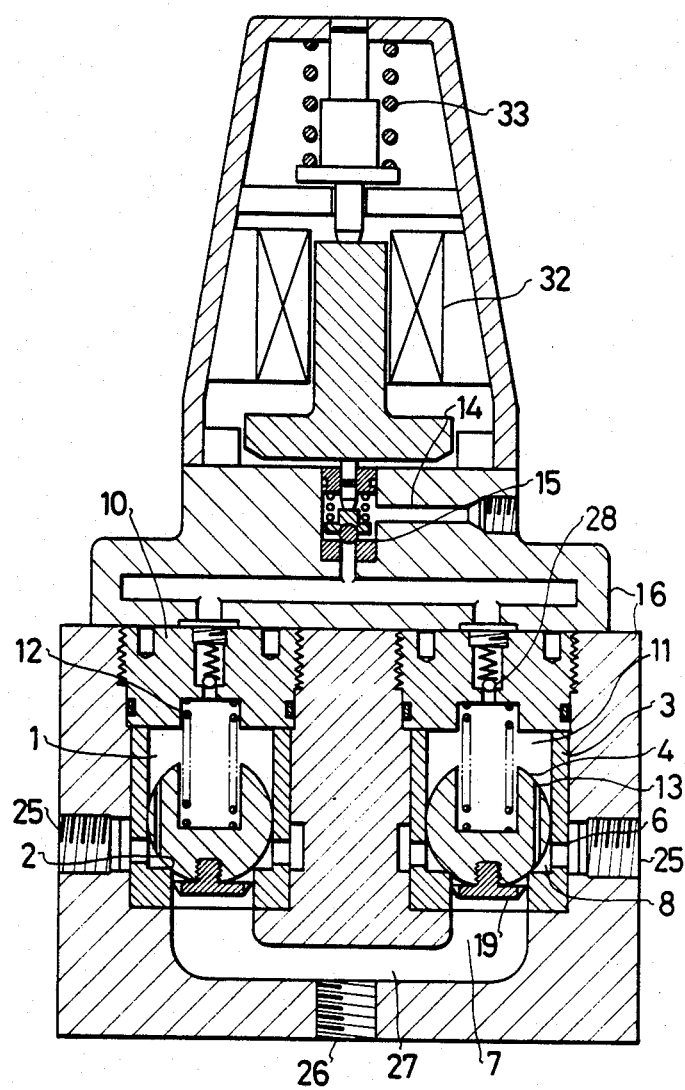
FIG. 7 is a longitudinal cross-section view of a sixth preferred embodiment of the present invention.

In a modified embodiment shown in FIG. 7, a B-port 26 is formed in the axial passageway 27, and the above-described communication passageways 13 are formed in the respective valve bodies 6. In this figure, the control valve 15 is illustrated in the form of an electromagnetic valve. Reference numeral 32 designates a solenoid, and reference numeral 33 designates a spring.

Since the valve according to the present invention is constructed as described above, more particularly, since the valve body is formed so as to have a spherical surface to be brought into contact with the valve seat, even if the attitude of the valve body should tilt slightly due to the clearance between the valve body and the sleeve, the valve body would always come into contact with the valve seat along a circular contact line, and therefore, the fear that the valve body may become into contact with the valve seat along an elliptic contact line, resulting in poor tight closure as is the case with the valve in the prior art, can be eliminated.

In addition, owing to the fact that the front chamber and the rear chamber are communicated with each other through the communication passageway having a smaller cross-section area than the side port, and that the control valve is provided in the control passageway for communicating the rear chamber with the exterior, it is possible to control a fluid at a high pressure with a very small force by manipulating the control valve.

Moreover, since the O-ring as used in the heretofore known valve is not used at the slide portion, the problem that the O-ring may fixedly stick to the casing, can be also eliminated.

What is claimed is:

1. A valve comprising a sleeve containing a cylindrical valve chamber having a circular valve seat, a valve body slidably seated within said valve chamber and having a spherical surface adapted to seal said valve seat, said valve body having a close fit with the walls of said valve chamber and dividing said valve chamber into a front portion and a rear portion, said front portion of said chamber being formed between said valve body and the adjacent valve seat; a fluid conduit communicating with said valve seat and extending oppositely from said valve member to a port opening through the exterior of said valve sleeve; a lateral port formed in said sleeve communicating with said front portion of said chamber; a valve body by-pass passage means associated with said valve chamber communicating with both said front and rear portions thereof, said passage means having a flow restriction therein of lesser flow capacity than either said lateral port or fluid conduit; means closing the rear end of said rear portion of said chamber, a spring in said rear portion seated against said means and said valve body and holding said valve body in normally closed position; a control valve adapted to exhaust exteriorly of said valve; a passageway communicating with said control valve and said rear portion for reducing the fluid pressure in said rear portion whereby said valve body will be shafted to open position irrespective of the direction of flow through said valve and of the orientation of the axis of said valve chamber; a deceleration member secured to said valve body, said member projecting into said fluid conduit from said valve body through said valve seat and having a radially extending head of a size such that only a small annular channel for fluid exists between it and the walls of said fluid conduit.

2. A valve as described in claim 1 wherein said valve member is spherical.

3. A valve as described in claim 1 wherein grooves are provided in the circumferential face of said member.

4. A valve as described in claim 1 wherein said by-pass passage means extends through said valve body.

5. A valve comprising a sleeve containing a pair of cylindrical valve chambers each having a circular valve seat, said valve seats being connected by a fluid passage, a valve body slidably seated within each of said valve chambers and each having one end at least a portion of which is of progressively decreasing diameter toward the valve seat, said end being adapted to seat against and form a seal with its adjacent valve seat, each of said valve bodies having a close fit with the walls of its valve chamber and dividing its valve chamber into a front portion and a rear portion, said front portions of said chambers being formed between said valve body and the adjacent valve seat; a pair of fluid ports formed in said sleeve, each communicating with the front portion of one of said chambers, one of said fluid ports serving as a fluid inlet and the other as a fluid outlet; separate passage means associated with each of said valve chambers communicating with both said front and rear portions thereof and providing a by-pass around the valve body, each passage means having a flow restriction therein of lesser flow capacity than either of said fluid ports; means closing the end of each of said rear portions of said chambers opposite from said valve seats, a spring in each of said rear portions urging said valve body into normally closed position; a control valve adapted to exhaust exteriorly of said sleeve; a passageway communicating with said control valve and with both of said rear portions for reducing the fluid pressure in both of said rear portions simultaneously whereby said valve bodies can be caused to shift by fluid pressure to open position irrespective of the direction of flow through said valve and of the orientation of the axis of said valve chamber.

6. A valve as described in claim 5 wherein said valve chambers are axially aligned.

7. A valve as described in claim 5 wherein the valve seat contacting portions of said valve bodies are hemispherical in shape.

8. A valve as described in claim 5 wherein said valve bodies are spherical.

9. A valve as described in claim 5 wherein a deceleration member is secured to each of said valve bodies, said member projecting into said fluid conduit from said valve bodies through said valve seats and having a radially extending head of a size such that only a small annular channel for fluid exists between it and the walls of said fluid passage.

10. A valve as described in claim 9 wherein grooves are provided in the circumferential face of said member.

11. A valve as described in claim 5 wherein said passage means is an opening of restricted cross section extending through each of said valve bodies.

12. A valve as described in claim 5 wherein check valve means are provided in said passageway adjacent each of said rear portions for preventing movement of fluid from one rear portion to the other.

13. A valve comprising a sleeve containing a pair of axially aligned cylindrical valve chambers each having a circular valve seat, said valve seats facing oppositely and connected by a fluid passage, a valve body slidably seated within each of said valve chambers and each having an end at least a portion of which is of a progressively decreasing diameter and providing a surface adapted to contact and seal agdinst the adjacent valve seat, each of said valve bodies having a close fit with the walls of its valve chamber and dividing its valve chamber into a front portion and a rear portion, said front portions of said chambers being formed between said valve body and the adjacent valve seat; a pair of fluid ports formed in said sleeve, each communicating with the front portion of one of said chambers, one of said fluid ports serving as a fluid inlet and the other as a fluid outlet; separate passage means associated with each of said valve chambers connecting said front and rear portions thereof and providing a by-pass around the valve body, said pasage means each having a flow restriction therein of lesser flow capacity than either of said fluid ports; closure means closing the end of each of said rear portions of chambers opposite from said valve seats, a spring in each of said rear portions urging the adjacent valve body into normally closed position; a control valve adapted to exhaust exteriorly of said sleeve; a passageway connecting said control valve to both of said rear portions whereby said valve bodies can be caused to shift in response to fluid pressure to open position irrespective of the direction of fluid flow through said valve; check valve means in said passageway preventing movement of fluid from one rear portion to the other.

14. A valve as described in claim 13 wherein the valve seat contacting portions of said valve bodies are hemispherical in shape.

15. A valve as described in claim 13 wherein said valve bodies are spherical.

16. A valve as described in claim 15 wherein said valve bodies shift sequentially in response to changes in fluid flow.

17. A valve as described in claim 16 wherein the sequential shifting of said valve bodies retards the rate of movement of said valve bodies reducing the creation of shock waves in the fluid.

* * * * *

UNITED STATES PATENT AND TRADEMARK OFFICE
CERTIFICATE OF CORRECTION

PATENT NO. : 4,676,271

DATED : June 30, 1987

INVENTOR(S) : Toshihiro Fujikawa

It is certified that error appears in the above-identified patent and that said Letters Patent is hereby corrected as shown below:

Column 1, line 12:
"character a" should be --character $\underline{a}$--.

Column 1, line 14:
"chamber b" should be --chamber $\underline{b}$--.

Column 1, line 14:
"character c" should be --character $\underline{c}$--.

Column 1, line 15:
"character d" should be --character $\underline{d}$--.

Column 1, line 17:
"portion e" should be --portion $\underline{e}$--.

Column 1, line 17:
"portion f" should be --portion $\underline{f}$--.

Column 1, line 18:
"character g" should be --character $\underline{g}$--.

Column 1, line 19:
"h designates" should be --$\underline{h}$ designates--.

Column 1, line 19:
"character i" should be --character $\underline{i}$--.

Column 1, line 20:
"character j" should be --character $\underline{j}$--.

Column 1, line 21:
"character k" should be --character $\underline{k}$--.

UNITED STATES PATENT AND TRADEMARK OFFICE
CERTIFICATE OF CORRECTION

PATENT NO. : 4,676,271

DATED : June 30, 1987

INVENTOR(S) : Toshihiro Fujikawa

It is certified that error appears in the above-identified patent and that said Letters Patent is hereby corrected as shown below:

Column 1, line 22:
 "character 1" should be --character $\underline{l}$--.
Column 1, line 23:
 "character m" should be --character $\underline{m}$--.
Column 1, line 24:
 "character n" should be --character $\underline{n}$--.
Column 1, line 24:
 "solenoid h" should be --solenoid $\underline{h}$--.
Column 1, line 25:
 "valve seat c" should be --valve seat $\underline{c}$--.
Column 1, line 26:
 "valve body d" should be --valve body $\underline{d}$--.
Column 1, line 26:
 "side port i" should be --side port $\underline{i}$--.
Column 1, line 27:
 "axial port j" should be --axial port $\underline{j}$--.
Column 1, line 32:
 "side port i" should be --side port $\underline{i}$--.
Column 1, line 33:
 "valve body d" should be --valve body $\underline{d}$--.
Column 1, line 34:
 "valve body d" should be --valve body $\underline{d}$--.
Column 1, line 35:
 "valve seat c" should be --valve seat $\underline{c}$--.
Column 1, line 37:
 "valve seat c" should be --valve seat $\underline{c}$--.
Column 1, line 38:
 "O-ring m" should be --O-ring $\underline{m}$--.
Column 1, line 38:
 "portion n" should be --portion $\underline{n}$--.
Column 1, line 40:
 "main body a" should be --main body $\underline{a}$--.

UNITED STATES PATENT AND TRADEMARK OFFICE
CERTIFICATE OF CORRECTION

PATENT NO. : 4,676,271

DATED : June 30, 1987

INVENTOR(S) : Toshihiro Fujikawa

It is certified that error appears in the above-identified patent and that said Letters Patent is hereby corrected as shown below:

Column 4, line 58:
    "valve body d" should be --valve body $\underline{d}$--.

Column 4, line 60:
    "valve body d" should be --valve body $\underline{d}$--.

Column 4, line 61:
    "valve seat c" should be --valve seat $\underline{c}$--.

Column 4, line 62:
    "valve seat c" should be --valve seat $\underline{c}$--.

Column 4, line 63:
    "valve body d" should be --valve body $\underline{d}$--.

Column 7, line 16:
    "may become into" should be --may come into--.

Column 7, line 58:
    "will be shafted" should be --will be shifted--.

Column 8, line 68:
    "and seal agdinst" should be --and seal against--.

Signed and Sealed this

Fifth Day of April, 1988

*Attest:*

DONALD J. QUIGG

*Attesting Officer*      *Commissioner of Patents and Trademarks*